Jan. 24, 1956

C. F. SCHAEFER 2,731,831

BAROMETRIC ALTIMETER

Filed May 14, 1952

INVENTOR.
CARL F. SCHAEFER
BY
Henry L. Shenier
ATTORNEY

Jan. 24, 1956

C. F. SCHAEFER 2,731,831

BAROMETRIC ALTIMETER

Filed May 14, 1952

INVENTOR.
CARL F. SCHAEFER
BY Henry L. Shewer
ATTORNEY

United States Patent Office 2,731,831
Patented Jan. 24, 1956

2,731,831
BAROMETRIC ALTIMETER

Carl F. Schaefer, Pleasantville, N. Y., assignor, by mesne assignments, to Norden-Ketay Corporation, a corporation of Illinois Application May 14, 1952, Serial No. 287,719

8 Claims. (Cl. 73—387)

My invention relates to a barometric altimeter and more particularly to a barometric device which will indicate true altitude as a function of barometric pressure and which will automatically make corrections for temperature.

In known barometric altimeters the scale is calibrated to read altitude as a function of barometric pressure. As an aircraft, for example, goes to higher altitudes the pressure of the circumambient air will drop due to its lower density. Since density is not a simple, direct function of pressure but varies in accordance with the temperature, it is necessary to make a correction in order to obtain true altitude. A pilot must make corrections to the indicated altitude reading from tables in which the indicated altitude and the average temperature between the surface and the altitude at which the measurement is made are used as arguments. This correction is then applied to the pressure altitude to obtain true altitude.

One object of my invention is to provide a barometric altimeter which will always indicate true altitude irrespective of variations in temperature of the circumambient atmosphere.

Another object of my invention is to provide a barometric altimeter in which altitude above a given landing field may be read directly and accurately.

Another object of my invention is to provide a barometric altimeter which automatically makes corrections for variations in density of the atmosphere which result from temperature changes.

Other and further objects of my invention will appear from the following description.

In general, my invention contemplates measuring changes in barometric pressure due to changes in altitude, multiplying these changes by the temperature, dividing the product by the total pressure, integrating the changes, multiplying the integral by a gas constant to obtain the altitude. I can measure temperature directly by a temperature-measuring device, or in a modification, make a temperature correction as a function of altitude change by means of an empirical law.

In the accompanying drawings which form part of the instant specification and which are to be read in conjunction therewith and in which like reference numerals are used to indicate like parts in the various views.

It is well known that the pressure of a fluid is equal to the average unit density of the fluid multiplied by the height of the column of fluid. A difference of pressure can be represented by the equation (1) $$dp = \delta dh$$

where $p$ is pressure $\delta$ is the density and $h$ is altitude or height.

Then density of a gas is expressed by the equation (2) $$\delta = \frac{P}{RT}$$

where P is the total pressure, R is the gas constant and T is the temperature.

Substituting the right-hand member of Equation 2 for $\delta$ in Equation 1, we obtain (3) $$dp = \frac{Pdh}{RT}$$

Transposing Equation 3, we obtain equation (4) $$dh = \frac{RTdp}{P}$$

Integrating Equation 4, we obtain (5) $$h = R \int \frac{Tdp}{P} + h_0$$

Figure 1:
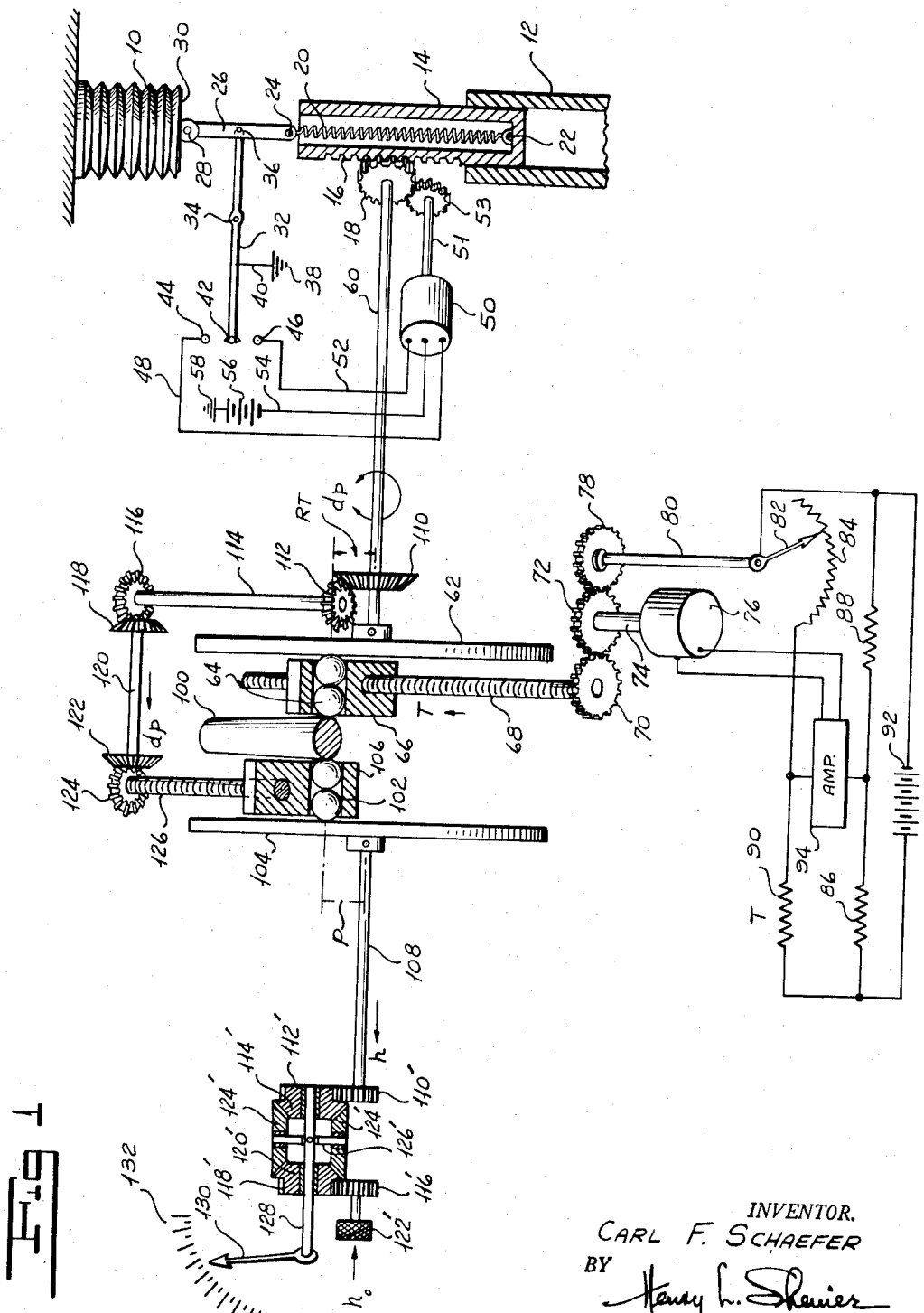
Figure 1 is a diagrammatic view of a barometric altimeter showing one embodiment of my invention in which I measure temperature by means of a resistance element and a bridge.

The embodiment of the invention in Figure 1 obtains altitude, $h$, by integrating the product of temperature and differences in pressure divided by the pressure, multiplying the integral by the gas constant, R.

Referring now to Figure 1, a flexible metal bellows 10 is mounted upon any suitable support and partially evacuated so that it will compress or expand in response to pressure changes of the circumambient atmosphere. A guide member 12 houses a reciprocable piston 14 which is formed with a rack 16 meshing with a pinion 18. A spring 20 is secured at its lower end 22 to the bottom of the piston 14. The upper end 24 of the spring 20 is secured to the lower end of a link 26 the upper end 28 of which is pivotally attached to the free end 30 of the bellows 10. A lever 32 is pivoted at a point 34 intermediate its ends. The right-hand end 36 of the lever is pivotally attached to the link 26. The lever 32 is electrically connected to a ground 38 by means of a conductor 40. The left-hand end of the lever carries a contact member 42 adapted to make alternate contact with fixed contact points 44 and 46. The contact point 44 is connected by conductor 48 to one armature winding of a motor 50 provided with poles of fixed polarity. The other contact point 46 is connected by conductor 52 to an oppositely wound armature winding of the motor 50. The motor 50 is provided with a shaft 51 to which is secured a pinion 53 which meshes with and drives pinion 18. A common terminal of the armature windings is connected by conductor 54 to a source of potential such as battery 56 the other terminal of which is grounded at 58. When contact point 42 of the lever makes contact with contact 44, the motor will run in one direction. When movable contact 42 makes contact with stationary contact 46, the motor 50 will run in the opposite direction.

It will be readily appreciated that if the barometric pressure increases, the bellows 10 will be compressed, pulling the link 26 upwardly against the action of spring 20 and rotating the lever 32 in a counterclockwise direction, completing the circuit from the battery through one armature winding by means of conductor 52, contact point 46 and thence to ground 38. This will cause the motor to run in a direction to rotate the pinion 18 in a clockwise direction viewed from the right, thus driving the piston 14 downwardly increasing the tension of spring 20 until the spring pressure balances the increased barometric pressure which caused the bellows 10 to compress, thus restoring the bellows to its original position. If the pressure is decreased the bellows will tend to expand, causing movable contact 42 to make contact with stationary contact 44, causing the motor to run in the opposite direction, thus reducing the tension on spring 20. It will be seen that my construction will cause the pinion 18 to rotate in one direction or the other depending on whether the barometric pressure is increased or decreased. The rotation of pinion 18, therefore, is a direct measure of changes of barometric pressure, thus measuring the term $dp$ in Equation 5.

The pinion 18 is secured to a shaft 60 the other end of which is connected to and drives a disk 62 of a ball and disk multiplier. The balls 64 of the multiplier are mounted in a displaceable carriage 66. The distance between the centers of the balls 64 and the axis of shaft 60 is the analogue of the temperature, T. The carriage 66 is adapted to be moved upwardly and downwardly, as viewed in Figure 1, by means of a screw 68 which carries a gear 70 meshing with a gear 72 which is secured to the motor shaft 74 of a motor 76. A gear 78 also meshes with the motor gear 72. This gear 78 is secured to a shaft 80 which carries the movable arm 82 of a variable resistor 84. The resistor 84 is connected in a Wheatstone bridge formed with two fixed resistors 86 and 88 and a platinum resistance element 90 adapted to measure temperature. It is well known to the art that the resistance of a platinum resistor will vary with the temperature. A source of potential 92 is connected across one pair of terminals of the bridge. An amplifier 94 is connected across the other pair of terminals of the bridge. As the temperature varies, the resistance of the temperature resistor will vary, unbalancing the bridge. The motor 76 is a reversible motor adapted to respond to the polarity of the output signal of the amplifier 94. As the temperature increases, the motor will rotate in a direction to increase the distance between the axis of the balls 64 and the shaft 60 and at the same time drive the movable arm 82 to bring the bridge back into balance. When the temperature decreases, the analogue distance representing temperature is decreased and the bridge brought back into balance. It will be seen that the action of the ball and disk multiplier gives us the product of temperature and increments of pressure, namely, $Tdp$ of Equation 5. The output of the disk and ball multiplier rotates the roller 100 and drives the balls 102 of a second disk and ball multiplier which comprises the balls 102 and the disk 104. The balls 102 are mounted in a carriage 106 which is displaced so that the distance from the axis of the balls 102 to the axis of the disk shaft 108 will represent the analogue of pressure P. It will be observed that the arrangement of the disk 104 and the balls 102 is such that this multiplier multiplies by the reciprocal of pressure, in other words, divides by pressure. Since the multiplier including disk 104 and balls 102, performs an inverse operation to multiplication, it may be termed a divider. If the pressure becomes small the speed of the disk 104 becomes greater. Theoretically, if the pressure were zero the disk would be driven at an infinite speed. In order that an integration of pressure changes may take place, I vary the position of the carriage 106 and hence the balls 102 in accordance with changes in pressure. A bevel gear 110 is secured to shaft 60 for rotation therewith. The bevel gear 110 meshes with the bevel gear 112 secured to one end of a shaft 114 the other end of which carries a bevel gear 116. The bevel gear 116 meshes with a bevel gear 118 secured to one end of a shaft 120 the other end of which carries a bevel gear 122 which in turn meshes with a bevel gear 124 secured to one end of a lead screw 126. Rotation of the lead screw is adapted to move the carriage 106 upwardly and downwardly. As the pressure increases, the carriage 106 moves upwardly in response to the rotation of shaft 60. As the pressure decreases, it will rotate shaft 60 correspondingly and move the carriage 106 downwardly. It is to be understood, of course, that T and P values are initially set which satisfy the relationship between temperature, pressure, and altitude at ground or any other convenient level. This predetermined temperature value is initially set by properly positioning balls 64, and the pressure value is set by properly positioning balls 102 on disk 104. Thus, it is seen that the output of the assembly as measured by the rotation of shaft 108 represents the expression $$\int \frac{Tdp}{P}$$

The gas constant, R, can be introduced at any suitable point by appropriate gear ratios. For example, the gear ratios between gears 70 and 72 may be such as to introduce the gas constant, R, into the temperature term. The shaft 108, which measures true barometric altitude, is driven by the disk 104. A pinion 110' is carried by one end of shaft 108 and meshes with the gear 112' secured to one side gear 114' of a differential. A pinion 116' meshes with a gear 118' secured to the other side gear 120' of a differential. The pinion 118' is adapted to be set manually by means of a knob 122' and is normally stationary after having been set. Rotation of the shaft 108, therefore, will cause the rotation of the side gear 114', causing the differential gears 124' to carry the stub shaft 126' around, thus rotating the shaft 128 to which the stub shaft 126' is secured. A pointer 130 associated with a scale 132 calibrated in feet of altitude will thus indicate altitude.

In operation, let us assume that we desire to measure actual altitude above an elevated point, as, for example, a landing field which is at an altitude of two thousand feet above sea level. The knob 122' is adjusted to move the pointer 130 to read zero altitude. This drives the pointer 130 without rotating the shaft 108 due to the well known action of the differential. As an aircraft in which my altimeter is mounted ascends, the pressure will decrease, permitting the bellows 10 to expand, thus moving the link 26 downwardly under the influence of the tension of spring 20 and rotating the lever 32 in a clockwise direction. This brings movable contact 42 into engagement with stationary contact 44 and drives the motor 50 to move the piston 14 upwardly, decreasing the tension on the spring 20. Since the drive is by the rotation of pinion 18, this rotation will be a measure of the pressure change due to decreased altitude. The rotation of pinion 18 will rotate the disk 62 through the shaft 60, rotating the balls 64. The balls 64 are positioned as a function of temperature due to the temperature measuring resistor 90 and its accompanying network. As the temperature decreases due to increased altitude, the bridge will be unbalanced to drive motor 76 to move the balls 64 downwardly agreeable to the decrease in temperature. The carriage 106 of the second multiplier is positioned in accordance with the analogue of the pressure. Variations in pressure are fed from the shaft 60 to the lead screw 126 so that the carriage 106 will always position the balls in accordance with actual pressure existing. As the pressure decreases, the carriage 106 is moved downwardly, thus increasing the effect of the rotation of the roller 100 upon the output disk 104. As the altitude increases, the pressure drops and the temperature drops. The integral of the right-hand side of Equation 5 is made manifest by the position of shaft 108 which is indicated by the pointer 130 adjacent the calibrated scale 132 which reads directly in altitude. In the case just outlined, the altitude, of course, will be that above the ground at the given airport. If altitude above sea level is desired, the knob 122' is initially adjusted to read the altitude above sea level at the airport.

Figure 2:
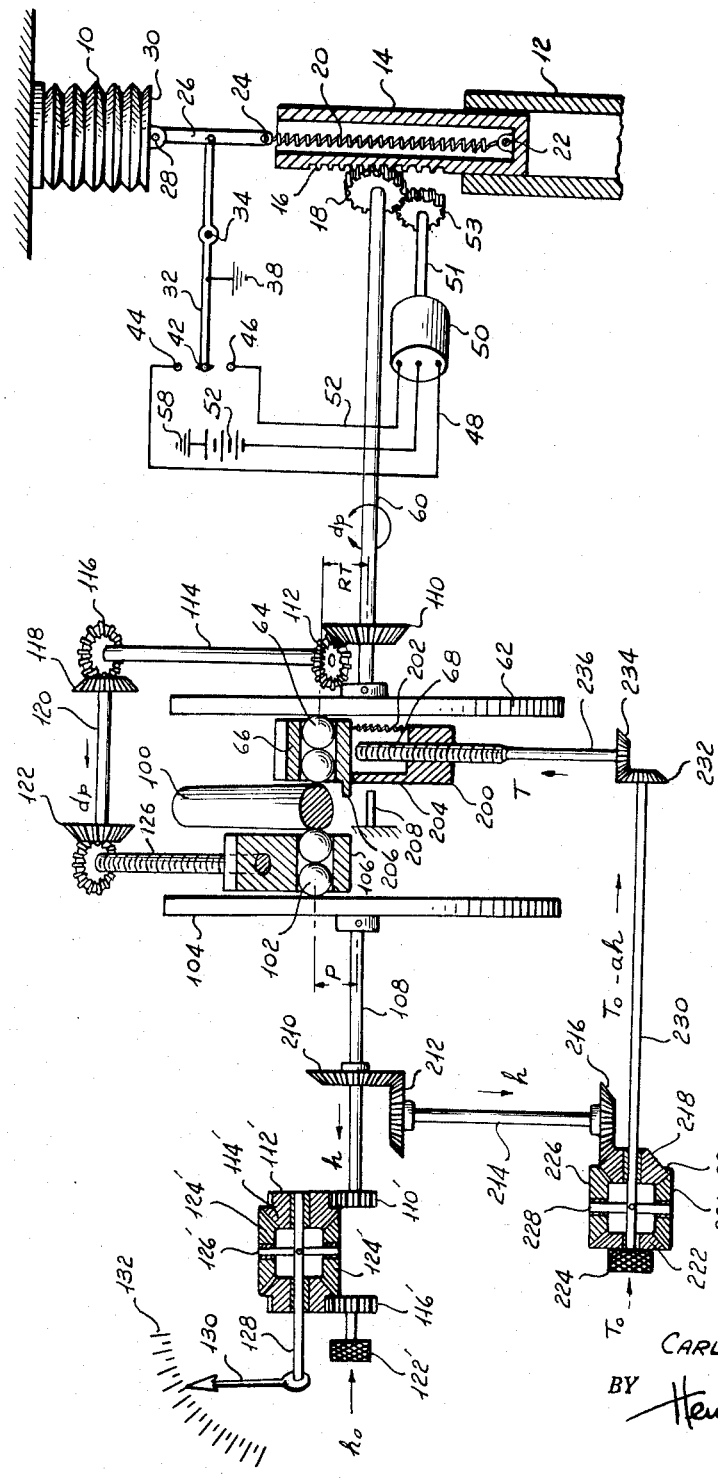
Figure 2 is a diagrammatic view of another embodiment of my invention in which I measure temperature as a function of altitude.

Referring now to Figure 2, it will be observed that the carriage 66 which carries the balls 64 is not driven from a bridge governed by a temperature-responsive resistance. In the construction in Figure 2, the carriage 66 is not driven directly from the lead screw 68. This lead screw is provided with a nut 200 which moves in response to the rotation of the lead screw 68. The carriage 66 is freely slideable relative to the lead screw and is urged downwardly toward the nut by means of a spring 202. A projection 204 formed integral with the nut limits the downward movement of the carriage so that normally the spring 202 urges the carriage against the projection 204. In this way, when the nut moves normally the carriage will move with the nut always in an upward direction and in a downward direction until a projection 206 formed on the carriage engages a stop member 208 which is carried in a fixed position. As the nut moves downwardly the carriage will continue to move downwardly until the projection 206 engages the stop 208. Thereafter the nut 200 will continue to travel downwardly extending the spring but maintaining the carriage in a fixed position against the stop. The stop is placed in a position which represents a temperature of −55° C. It is an empirical rule under standard atmospheric conditions (6) $$T = T_0 - ah$$

where T is the temperature of the atmosphere, $T_0$ is 288° Kelvin or 15° C., and $a$ is a multiplier which is 2° C. per one thousand feet of altitude. In other words, the temperature drops 2° C. for every one thousand feet of altitude until the thirty-five thousand feet is reached, at which point the temperature reaches −55° C. and remains at this temperature for all altitudes above thirty-five thousand feet.

It will be seen that we can make a correction in temperature as a function of changes in altitude directly from the output of disk 104, the position of which represents altitude. The output shaft 108 carries secured thereto for rotation therewith a bevel gear 210 which meshes with a bevel gear 212 carried by a shaft 214 to which is secured a bevel gear 216 meshing with a bevel gear 218 formed with one side gear 220 of a differential. The other side gear 222 of the differential is adapted to be set by hand through a knob 224 to indicate $T_0$. As the altitude decreases, the output shaft 108 will drive gear 220 and rotate the differential gears 226 attached to the stub shaft 228 which is secured to the shaft 230. The stub shafts will be carried around by the rotation of the side gear 218 to rotate the shaft 230, thus rotating bevel gear 232 and transmission bevel gear 234 which is carried by a shaft 236 to which the lead screw 68 is secured. The gear ratios are such that for every thousand feet in altitude change the lead screw will be rotated an equivalent to 2° C. in temperature. As the altitude increases, the nut 200 moves downwardly and the carriage 66 will follow up to a temperature of −55° C. Thereafter, if the altitude is increased, the nut will continue to move downwardly but the carriage will not move further. As the temperature is increased, the carriage will be driven upwardly.

The barometric altitude which is read on the scale 132 in Figure 2 is one derived by the same law as that in Figure 1, that is, from the expression shown in Equation 5 above. The temperature term of the expression, however, is derived from the measured altitude instead of from actual measurement, in accordance with an empirical law which is sufficiently accurate for most purposes.

It will be seen that I have accomplished the objects of my invention.

I have provided a barometric altimeter which will always indicate true altitude irrespective of variations of temperature of the circumambient atmosphere. I have provided a barometric altimeter which automatically makes correction for variation in the density of the atmosphere which results from temperature changes and in which altitude above a given landing field may be read directly and accurately.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described. For example, the torque of motor 50 can be applied through gear 110' instead of through gear 18. The disk 104 may be provided with peripheral teeth and the motor drive 50 may be applied through this disk.

Having thus described my invention, what I claim is:

1. In an altimeter, a means responsive to changes in pressure, a temperature responsive means, a multiplier having two input means and an output producing means, a divider having two input means and an output producing means, means for introducing the response of the pressure change responsive means to one input means of the multiplier and to one input means of the divider, said one input means of said divider being initially set to represent a predetermined pressure, means for introducing the response of the temperature responsive means to the other input means of the multiplier, means for introducing the output of the multiplier to the other input means of the divider, means for indicating altitude, and means responsive to the output producing means of the divider for actuating the altitude indicating means.

2. In an altimeter, a partially evacuated bellows adapted to expand and contract in response to changes in atmospheric pressure, means for fixably mounting one end of the bellows, a spring, means for connecting one end of the spring to the free end of the bellows, means for placing tension on the spring to bring the free end of the bellows to a predetermined position, spring tension adjusting means responsive to movement of the free end of the bellows due to chages in atmospheric pressure for altering the tension on the spring to bring the free end of the bellows back to the predetermined position, a ball and disk multiplier, means for measuring temperature of the atmosphere, means responsive to the temperature measuring means for positioning the ball of the multiplier, a ball and disk divider, rotary means positioned between the ball of the multiplier and the ball of the divider whereby motion is transmitted between the ball of the multiplier and the ball of the divider, means responsive to the movement of the tension adjusting means for positioning the ball of the divider, the ball of said divider being initially set to represent a predetermined pressure, means responsive to the movement of the tension adjusting means for driving the disk of one of said multiplier and divider and an altitude indicator actuating disk engaging the ball of the divider.

3. An altimeter as in claim 2 in which said means for measuring the temperature of the atmosphere comprises a Wheatstone bridge having a temperature responsive resistor in one arm and a variable resistor in another arm, means for varying the variable resistor, and means responsive to the unbalance of the bridge due to temperature changes acting upon said temperature responsive resistor for actuating said varying means to bring the bridge back to balance, said means responsive to the unbalance of the bridge being operatively connected to said means for positioning the ball of said multiplier.

4. An altimeter as in claim 2 in which said means for measuring temperature of the atmosphere comprises a gear train, means driven by the disk of said divider for driving said gear train, said gear train having a ratio to indicate 1° C. of temperature change for a rotation of said disk of said divider corresponding to five hundred feet of altitude change, the orientation of the gear train being such that the temperature will drop as the altitude increases.

5. An altimeter as in claim 2 in which said means for measuring temperature of the atmosphere comprises a gear train, means driven by the disk of said divider for driving said gear train, said gear train having a ratio to indicate 1° C. of temperature change for a rotation of said disk of said divider corresponding to five hundred feet of altitude change, the orientation of the gear train being such that the temperature will drop as the altitude increases, said means responsive to the temperature measuring means for positioning the ball of the multiplier including a yieldable connection and a stop, said stop being positioned so that when a temperature of −55° C. is reached no further movement of the ball of the multiplier to a position corresponding to a lower temperature will occur.

6. An altimeter as in claim 2, including altitude indicating means, means including a differential driven by the disk of the divider for actuating said altitude indicating means, the construction being such that an initial altitude may be set into the altitude indicator independently of movement of the disk of said divider.

7. An altimeter as in claim 2 in which said means for measuring temperature of the atmosphere comprises a gear train, means driven by the disk of said divider for driving said gear train, said gear train having a ratio to indicate 1° C. of temperature change for a rotation of said disk of said divider corresponding to five hundred feet of altitude change, the orientation of the gear train being such that the temperature will drop as the altitude increases, said gear train including a differential whereby the ball of the multiplier may be positioned independently of movement of the disk of said divider.

8. In an altimeter, a pressure responsive means, a motor controlled by the pressure responsive means, a ball and disk multiplier, a ball and disk divider, means for positioning the ball of the divider from said motor, the ball of said divider being initially set to represent a predetermined pressure, means for transmitting motion between the ball of the divider and the ball of the multiplier, means for indicating altitude, means driven by the disk of the divider for actuating said altitude indicating means, a carriage for the ball of the multiplier, a lead screw, means for driving the lead screw from the disk of the divider, a nut positioned on the lead screw, a spring for connecting the ball carriage of the multiplier to the nut, stop means for the carriage and means for driving said multiplier disk from the motor, the construction being such that after predetermined movement of the carriage in one direction it will engage the stop means while the nut may continue to move, stretching the interconnecting spring.

References Cited in the file of this patent
UNITED STATES PATENTS

| | | |
|---|---|---|
| 2,167,412 | Baesecke | July 25, 1939 |
| 2,398,470 | Shivers | Apr. 16, 1946 |
| 2,598,681 | Garbarini et al. | June 3, 1952 |
| 2,599,288 | Schaefer | June 3, 1952 |